Patented Sept. 7, 1943

2,329,070

UNITED STATES PATENT OFFICE 2,329,070

PROCESS FOR THE PRODUCTION OF PHENOL AND ITS HOMOLOGUES FROM CHLOROBENZENE AND ITS HOMOLOGUES

Wilhelm Nikolaus Mathes, Ludwigshafen-on-the Rhine, Germany, assignor to Durez Plastics and Chemicals, Inc., North Tonawanda, N. Y.

No Drawing. Application November 21, 1941, Serial No. 420,012

20 Claims. (Cl. 260—629)

The invention relates to the production of aromatic hydroxy-compounds such as phenol and its homologues from ring-chlorinated aromatic hydrocarbons such as chlorobenzene and its homologues in the vapor phase, and especially to the use of a new catalyst in this procedure.

For the production of phenol by the reaction of chlorobenzene and water in the vapor phase, silica gel, fuller's earth, and metal salts of orthophosphoric acid have heretofore been used. Most of these catalysts have the disadvantage that it is not possible to obtain solid grains of the catalyst, in a form suitable for use in the reaction, by merely filtering the precipitates, drying and heating them. For example, in the case of a precipitate resulting from the mixture of solutions containing manganese and orthophosphoric acid radicals in such proportions that $Mn_3(PO_4)_2$ can be produced, only a powder is obtained when the filtered precipitate is dried. It is necessary to add a binder to this powder and to press it into tablets or lumps before it may be used as a catalyst. In other cases, catalysts such as silica gel as well as manganese orthophosphate have a very short life. Again, some catalysts such as tricalcium phosphate, while having a longer life, are unsatisfactory because they become inactivated after short periods of operation because of the deposition of carbon-like substances thereon. These catalysts must therefore be regenerated at short intervals.

It is known to add to such catalysts small amounts of copper compounds, especially copper salts, in order to increase the conversion produced by the catalyst.

The primary object of the present invention is to improve the reaction which results in the production of phenol and its homologues by the use of a catalyst which avoids the above disadvantages.

A further object of the invention is to render the process more economical by the use of a catalyst which is precipitated in a lump form, suitable for use in the process, without requiring a separate treatment for the formation of tablets or lumps.

Still another object of the invention is to provide a catalyst which may be used without binding agents, so that the active catalytic surface is not reduced by the presence of a binder on portions thereof.

An additional object of the invention is to provide a catalyst which has a longer life, and which requires regeneration at less frequent and for shorter intervals, than those heretofore known.

It has now been found, according to the present invention, that in the production of aromatic hydroxy-compounds by the reaction of ring-chlorinated aromatic hydrocarbons and water in the vapor phase, considerably less deposits of carbon-like compounds form per unit of time on the manganese salts of pyrophosphoric acid, than on the best catalysts heretofore known. It is furthermore possible to obtain these salts in a granular or lump form suitable as such for use as catalysts simply by precipitation, filtering, washing and drying. These catalysts are equal to the known catalysts in their rate of conversion, yield and life.

The use of manganese pyrophosphate therefore makes it possible to produce a catalyst without the usual difficult manufacture of tablets, this catalyst being useful for longer periods of operation without regeneration, thus increasing the time between regenerations and shortening the time required therefor. By the use of such a catalyst the economy of operation is considerably improved.

It is advisable to add small amounts of copper compounds such as copper salts to the manganese pyrophosphate in order to increase the output. Preferably about 0.1 to 100 grams of copper salts are added per litre of catalyst. As copper salts, copper chloride, copper orthophosphate, copper pyrophosphate and copper acetate are among those which may be used.

There may be used as the principal catalytic constituent either neutral manganese pyrophosphate (in which all hydrogen atoms of the pyrophosphoric acid are replaced) or acid manganese pyrophosphates (in which the hydrogen atoms are only partially replaced). Especially advantageous results are obtained if about equimolecular amounts of neutral and acid manganese pyrophosphates are used.

The reaction is preferably carried out at temperatures exceeding 350° C., especially those between about 350° C. and 600° C. Instead of chlorobenzene, other ring-chlorinated aromatic hydrocarbons, especially homologues of chlorobenzene may be used yielding the corresponding aromatic hydroxy-compounds especially homologues of phenol. By way of example, the aromatic hydroxy-compounds ortho- and para-cresol may be produced from the ring-chlorinated hydrocarbons ortho- and parachlor-toluene.

The following examples show some modes of carrying out the process.

Example 1

788 grams of manganese chloride ($MnCl_2.4H_2O$) are dissolved in 20 liters of water. To this a solution of 532 grams $Na_4P_2O_7$ in 20 liters of water is added at room temperature, and the mixture is agitated. A nearly insoluble precipitate is obtained which is filtered, washed and dried in the usual way, and is of granular or lump form. A watery solution of 10 grams of copper chloride is poured over one liter of this granular catalyst, and the catalyst is again dried. The vapors of 400 ccm. of parachlortoluene and 53 ccm. of water are passed at 500 C. over this catalyst. 60 grams of paracresol are obtained.

Example 2

394 grams of manganese chloride ($MnCl_2.4H_2O$)

are dissolved in 10 liters of water. A solution of 444 grams of $Na_2H_2P_2O_7$ in 10 liters of water is added and the mixture is agitated. To this mixture 2 liters of a normal solution of ammonia containing 5 grams of copper nitrate are added. After thoroughly agitating the mixture, the precipitate is filtered with suction, washed and dried.

Example 3

394 grams of manganese chloride ($MnCl_2.4H_2O$)

are dissolved in 5 liters of water. Thereto a solution of 266 grams of $Na_4P_2O_7$ in 5 liters of water is added and the mixture is agitated.

394 grams of manganese chloride ($MnCl_2.4H_2O$)

are dissolved in 5 liters of water. A solution of 444 grams of $Na_2H_2P_2O_7$ in 5 liters of water containing also 34 grams of ammonia is added, and the mixture is agitated.

5.7 grams of copper chloride ($CuCl_2.2H_2O$) are dissolved in 500 ccm. of water and mixed with a solution of 4.5 grams of $Na_4P_2O_7$ in 500 ccm. water, and the mixture is agitated.

The precipitates produced separately by these reactions are freed from most of the water by decantation, mixed, filtered with suction and washed and dried in the usual way.

1 liter of this catalyst yields, at 520° C., 50 grams of phenol per hour at a high rate of yield, when the vapors of 400 ccm. of chlorobenzene and 400 ccm. of water are passed over it.

Example 4

861 grams of manganese nitrate ($Mn(NO_3)_2.6H_2O$)

are dissolved in 5 liters of water. To this solution a solution of 399 grams of $Na_4P_2O_7$ in 5 liters of water is added and the mixture is agitated.

430 grams of manganese nitrate ($Mn(NO_3)_2.6H_2O$)

are dissolved in 5 liters of water, a solution of 333 grams of $Na_2H_2P_2O_7$ in 5 liters of water is added and the mixture is agitated.

11.4 grams of copper chloride ($CuCl_2.2H_2O$) are dissolved in 500 ccm. of water and mixed with a solution of 9 grams of $Na_4P_2O_7$ in 500 ccm. water, and the mixture is agitated.

The precipitates obtained by these reactions are freed from most of the water by decantation, mixed, again thoroughly agitated, then filtered as usual, washed and dried. When the vapors of chlorobenzene and water are passed over this catalyst, it gives results quite similar to the catalyst described in Example 3.

While I have described herein some embodiments of my invention, I wish it to be known that I do not intend to limit myself thereby, except within the scope of the appended claims.

I claim:

1. The process of producing aromatic hydroxy-compounds comprising the treatment of a ring-chlorinated aromatic hydrocarbon with steam at elevated temperatures in the presence of a pyrophosphate of manganese as a catalyst.

2. The process for producing aromatic hydroxy-compounds comprising the treatment of a ring-chlorinated aromatic hydrocarbon with steam at temperatures exceeding 350° C. in the presence of a pyrophosphate of manganese as a catalyst.

3. The process for producing aromatic hydroxy-compounds comprising the treatment of a ring-chlorinated aromatic hydrocarbon with steam at temperatures exceeding 350° C. in the presence of neutral manganese pyrophosphate as a catalyst.

4. Process for the production of phenol comprising treating chlorobenzene with water in the vapor phase at increased temperature in the presence of neutral manganese pyrophosphate as a catalyst.

5. Process according to claim 4 in which the catalyst contains at least one copper salt.

6. Process for the production of phenol comprising treating chlorobenzene with water in the vapor phase at increased temperature in the presence of acid manganese pyrophosphate as a catalyst.

7. Process for the production of phenol which comprises passing the vapors of phenol and chlorobenzene at increased temperature over an acid manganese pyrophosphate, to which at least one copper salt has been added, as a catalyst.

8. Process for the production of phenol comprising the treatment of chlorobenzene with water in the vapor phase at increased temperature in the presence of a mixture of neutral and acid manganese pyrophosphates as a catalyst.

9. Process for the production of phenol comprising the treatment of chlorobenzene with water in the vapor phase at increased temperature in the presence of a mixture of neutral and acid manganese pyrophosphates, containing a small amount of a copper salt, as a catalyst.

10. Process for the production of a substance selected from the group consisting of phenol and its homologues, which comprises the treatment of a substance selected from the group consisting of chlorobenzene and its homologues with water in the vapor phase at increased temperature in the presence of manganese pyrophosphate as a catalyst.

11. Process according to claim 10 in which the catalyst contains at least one copper salt.

12. Process for the production of a substance selected from the group consisting of phenol and its homologues, which comprises the treatment of a substance selected from the group consisting of chlorobenzene and its homologues with water in the vapor phase at increased temperature in the presence of an acid manganese pyrophosphate as a catalyst.

13. Process for the production of a substance selected from the group consisting of phenol and its homologues, which comprises the treatment of a substance selected from the group consisting of chlorobenzene and its homologues with water in the vapor phase at increased temperature in the presence of an acid manganese pyrophosphate, containing a small amount of a copper salt, as a catalyst.

14. Process for the production of a substance selected from the group consisting of phenol and its homologues, which comprises the treatment of a substance selected from the group consisting of chlorobenzene and its homologues with water in the vapor phase at increased temperature in the presence of a mixture of neutral and acid manganese pyrophosphates as a catalyst.

15. Process for the production of a substance selected from the group consisting of phenol and its homologues, which comprises the treatment of a substance selected from the group consisting of chlorobenzene and its homologues with water in the vapor phase at increased temperature in the presence of a mixture of neutral and acid manganese pyrophosphates, containing a small amount of a copper salt, as a catalyst.

16. The process for producing phenol comprising the treatment of chlorobenzene with steam at temperatures exceeding 350° C. in the presence of a pyrophosphate of manganese, as a catalyst.

17. The process for producing aromatic hydroxy-compounds comprising the treatment of a ring-chlorinated aromatic hydrocarbon with steam at temperatures between 350° C. and 650° C. in the presence of a pyrophosphate of manganese, as a catalyst.

18. The process for producing phenol comprising the treatment of chlorobenzene with steam at temperatures between 350° C. and 650° C. in the presence of a pyrophosphate of manganese as a catalyst.

19. The process for producing phenol comprising the treatment of chlorobenzene with steam at temperatures between 350° C. and 650° C. in the presence of a mixture of acid and neutral manganese pyrophosphates, as a catalyst.

20. The process for producing phenol comprising the treatment of chlorobenzene with steam at temperatures between 350° C. and 650° C. in the presence of a pyrophosphate of manganese, as a catalyst, to which catalyst a compound of copper has been added.

WILHELM NIKOLAUS MATHES.